Aug. 16, 1938.  W. L. HAMILTON  2,127,115
ROPE SOCKET OR CAPEL
Filed Aug. 19, 1937
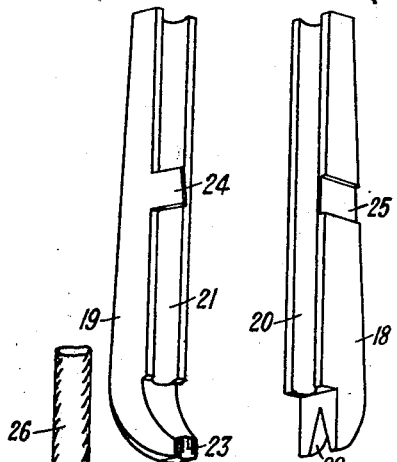
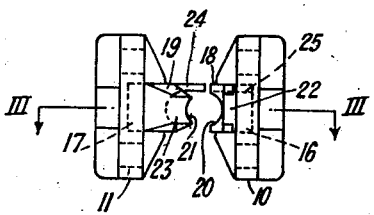
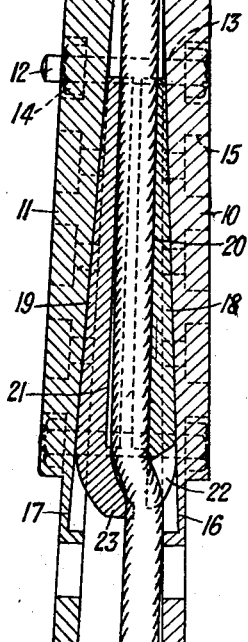
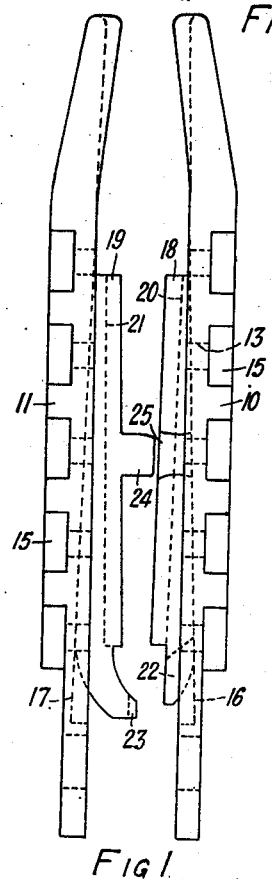
INVENTOR
William Lindsay Hamilton
BY
Pennie, Davis, Marvin & Edmonds
ATTORNEYS.

Patented Aug. 16, 1938

2,127,115

UNITED STATES PATENT OFFICE 2,127,115

ROPE SOCKET OR CAPEL

William Lindsay Hamilton, Glasgow, Scotland

Application August 19, 1937, Serial No. 159,865
In Great Britain August 27, 1936

3 Claims. (Cl. 24—126)

This invention relates to improvements in rope sockets or capels for attachment to a wire or other rope, and aims to provide a simple and inexpensive construction capable of being fitted by unskilled labour.

More particularly, the invention relates to rope sockets or capels of the type comprising grooved plates adapted to be held together in face to face relation and wedge members slidable in the grooves and each formed on its face adjacent to the other wedge member with a groove of segmental form in cross-section.

A rope socket or capel according to the invention includes a pair of plates interconnected in face to face relation, a complementary pair of wedge members interposed between the plates and guided for longitudinal sliding movement relatively to the plates, said wedge members presenting complementary rope-engaging channels of segmental form in cross section, thus together presenting a rope-engaging passage and guideways for the wedge members, constituted by parallel-sided longitudinally tapered grooves formed in the inner faces of the plates, one of said wedge members being bifurcated at the entrance end of said passage and the other wedge member being provided with a toe projecting inwardly beyond its inner face and adapted to deflect the rope into the bifurcation.

The surface of the guideway in each plate may be polished for relatively frictionless engagement with the mating surface of the respective wedge member, provision being made if desired, for introduction of lubricant between the polished surfaces. The rope-engaging channels of the wedge member are left rough or roughened.

In the accompanying drawing Fig. 1 is a side view and Fig. 2 an inverted plan of a rope socket or capel according to the invention; Fig. 3 is a vertical section showing the rope socket or capel attached to a rope, the plane of the section being on the line III—III of Fig. 2; Fig. 4 is a perspective view showing the wedge members, detached from the plates.

The same reference characters indicate corresponding parts in the several figures.

Referring to the drawing, the socket illustrated comprises a pair of sister plates 10, 11 adapted to be held together in face to face relation by means of bolts 12 passed through holes 13 in said plates and provided with nuts 14, the outer faces of the plates being preferably formed with recesses as 15 to receive the heads and the nuts of the bolts 12. Said plates are each formed with longitudinally tapered guideways 16, 17, respectively, of rectangular form in cross section, in which is slidably received the associated wedge members 18, 19. The wedge members 18, 19 are formed on their inner faces with complementary rope-engaging channels 20, 21, respectively, of segmental form in section to fit the contour of the rope 26, the channels being left rough or roughened. At the wide end of the wedge member 18 beyond the channel 20 is a substantially V-shaped slot 22. The mating wedge member 19 is formed with a toe 23 adapted locally to deflect the rope 26 into the slot 22 as the wedge members 18, 19 tighten on to the rope. The guideways 16, 17 are of rectangular form in cross-section so that the wedge members 18, 19 are not only guided longitudinally but are also prevented from lateral shift. The wedge members 18, 19 are held against longitudinal movement relatively to one another by a projecting tongue 24 on the wedge member 19 engaging in a groove 25 in the wedge member 18.

Modifications may be made in the construction of the socket without departing from the spirit of the invention.

I claim:

1. A rope socket comprising a pair of plates interconnected in face to face relation, the opposing faces of each of said plates having longitudinally extending guides, a pair of clamping members interposed between said plates and slidable along said guides, the opposing faces of said clamping members having cooperating grooves providing between them a space for a rope to be clamped, one of said clamping members having a toe piece at one end beyond the groove in said other member and projecting at least in part across said rope space, whereby when a rope is clamped between said clamping members a part of it will be deflected by said toe piece from alignment with that part which is clamped within said grooves.

2. A rope socket comprising a pair of plates interconnected in face to face relation, the opposing faces of each of said plates having longitudinally extending guides, a pair of clamping members, at least one of which is a wedge member interposed between the said plates and slidable along said guides, the opposing faces of said clamping members having cooperating grooves providing between them a space for a rope to be clamped, one of said clamping members having a notch at one end and the other of said clamping members having a toe piece opposite said notch and projecting at least in part across said rope space, whereby when a rope is clamped between said members a part of it will be deflected by said toe piece into said notch.

3. A rope socket including a pair of plates interconnected in face to face relation and each formed on its inner face with a longitudinal parallel-sided groove, and a complementary pair of wedge members interposed between said plates and slidable in said grooves, said wedge members presenting between them a straight longitudinal passage of substantially circular section, one of said wedge members being formed with a V-shaped notch at one end of said passage and the other of said members being provided with a toe-piece projecting transversely of said passage and opposite said notch.

WILLIAM LINDSAY HAMILTON.